United States Patent [19]
Gebhart et al.

[11] 3,904,707
[45] Sept. 9, 1975

[54] FLAME RETARDANT POLYESTER COMPOSITIONS

[75] Inventors: Charles J. Gebhart, Akron; Clyde E. Gleim, Bath, both of Ohio

[73] Assignee: The Goodyear Tire & Rubber Company, Akron, Ohio

[22] Filed: Nov. 25, 1974

[21] Appl. No.: 526,545

Related U.S. Application Data
[63] Continuation of Ser. No. 370,125, June 14, 1973, abandoned.

[52] U.S. Cl. .......... 260/873; 117/128.4; 260/45.7 R; 260/45.75 R; 260/DIG. 24
[51] Int. Cl.² .......................................... C08G 39/10
[58] Field of Search ..... 260/873, 75 T, 75 H, 45.75, 260/7 R, 876, DIG. 24

[56] References Cited
UNITED STATES PATENTS

| | | | |
|---|---|---|---|
| 3,681,281 | 8/1972 | Juelke et al. | 260/873 |
| 3,686,361 | 8/1972 | Dewitt et al. | 260/873 |
| 3,780,141 | 12/1973 | Jin et al. | 260/873 |

*Primary Examiner*—Melvin Goldstein
*Assistant Examiner*—T. Pertilla
*Attorney, Agent, or Firm*—F. W. Brunner; J. P. Ward

[57] ABSTRACT

Polyester compositions having flame retardant characteristics comprising (A) a high molecular weight linear polyester selected from the group consisting of copolyesters and blends of copolyesters and homopolyesters and (B) a synergistic mixture of from 5 to 10 percent by weight, based on the total weight of said composition, of polyvinyl chloride and from 5 to 10 percent by weight, based on the total weight of said composition, of at least one compound selected from the group consisting of antimony trioxide, boron trioxide, tetrabromophthalic anhydride, tetrachlorophthalic anhydride and chlorendic acid anhydride.

7 Claims, No Drawings

FLAME RETARDANT POLYESTER COMPOSITIONS

This application is a continuation of our U.S. application Serial No. 370,125 filed June 14, 1973, now abandoned.

This invention relates to polyester resin compositions having improved flame retardant characteristics. More specifically the invention relates to flame retardant polyester resin compositions consisting of high molecular weight linear copolyesters and blends of high molecular weight linear copolyesters and homopolyesters in admixture with synergistic combinations of polyvinyl chloride with metallic oxides and/or halogen containing acid anhydrides.

The use of certain additives for the purpose of reducing the flammability and/or improving the flame extinguishing properties of various thermoplastic polymers is well known in the art. Among the additives that have been employed for such a use are various types of phosphorous containing compounds. The phosphorous compounds are generally used either alone or in combination with other materials such as antimony compounds. Certain analogous materials such as chlorostyrene copolymers, chlorinated paraffin waxes, alone or with antimony oxide, are also known to be effective flame retardants for resinous materials. One drawback of these known compounds and combinations, however, has been the fact that generally large amounts, i.e. upwards of 35 percent of the additive, must be incorporated into the polymer in order to render it reasonably flame retardant. Such large quantities of additive often times deleteriously alter the properties of the polymer and, moreover, some additives tend to crystallize or bleed out of the polymer after a relatively short time of incorporation therein. Furthermore, some of the known flame retardant additives, such as chloroparaffin and chlorinated polyethylene, are not compatible with the polymer compositions and are not useful for many applications.

It is an object of this invention to provide polyester compositions with flame retardant properties. It is also an object to provide such polyester compositions that are useful for coating articles such as electrical conductors. Other objects will appear as the description proceeds.

Accordingly, this invention comprises essentially linear polyester compositions possessing flame retardant properties, said polyester compositions comprising (A) a high molecular weight essentially linear polyester selected from the group consisting of copolyesters characterized by having intrinsic viscosities of at least 0.5 and preferably greater than 0.7 and blends of copolyesters and homopolyesters each of which are characterized by having intrinsic viscosities of at least 0.5 and preferably greater than 0.7 and (B) a synergistic mixture comprised of from 5 to 10 percent by weight, based on the total weight of said polyester compositions, of polyvinyl chloride and from 5 to 10 percent by weight, based on the total weight of said polyester compositions, of at least one material selected from the group consisting of antimony trioxide, boron trioxide, tetrabromophthalic anhydride, tetrachlorophthalic anhydride and chlorendic acid anhydride. These polyester compositions were found to have excellent flame retardant properties and to possess good thermal and electrical properties.

The (A) component of the polyester compositions of this invention include both high molecular weight essentially linear copolyesters and blends of high molecular weight essentially linear copolyesters and high molecular weight essentially linear homopolyesters. Copolyesters useful as the (A) component include those copolyesters prepared by reacting two or more dicarboxylic acids, selected from the group consisting of saturated aliphatic and aromatic dicarboxylic acids, or the lower alkyl ($C_1$–$C_4$) esters thereof with one or more glycols such as those of the series $HO(CH_2)_nOH$ where n is an integer ranging from 2 to 10 and glycols of the series $HOCH_2C(R)_2CH_2OH$ where R is selected from the group consisting of hydrogen and alkyl and aryl radicals or copolyesters prepared by reacting two or more of the above defined glycols with one or more of the above defined dicarboxylic acids or lower alkyl esters thereof. The esterification reaction is carried out under the usual esterification or transesterification conditions. The resulting esterification or transesterification product is then polycondensed at elevated temperatures and reduced pressures to form the desired high molecular weight linear copolyesters. Representative examples of the copolyesters useful as the (A) component include poly(ethylene terephthalate/isophthalate), poly(ethylene terephthalate/2,6-naphthalate), poly(ethylene terephthalate/2,7-naphthalate), poly(ethylene terephthalate/2,6-naphthalate/2,7-naphthalate), poly(tetramethylene terephthalate/isophthalate/sebacate), poly(ethylene/neopentyl terephthalate), poly(1,3-trimethylene terephthalate/isophthalate), poly(ethylene, 1,3-trimethylene terephthalate), poly(tetramethylene terephthalate/isophthalate), poly(ethylene terephthalate/sebacate) and the like.

The high molecular weight linear homopolyesters which can be blended with the above described copolyesters to form the (A) component of the flame retardant polyester compositions constituting the invention include those prepared by reacting a free aromatic dicarboxylic acid or lower alkyl ($C_1$–$C_4$) ester thereof with a glycol such as those corresponding to the above formulae. Again, as in the preparation of the copolyesters, the esterification or transesterification reaction and the subsequent polycondensation reaction are carried out employing well known techniques and conditions. Representative examples of the homopolyesters which can be blended with the copolyesters include poly(ethylene terephthalate), poly(trimethylene terephthalate), poly(tetramethylene terephthalate), poly(hexamethylene terephthalate), poly(ethylene-2,6-naphthalate), poly(ethylene-2,7-naphthalate), poly(ethylene phenylindanate) and the like.

When the (A) component of the flame retardant polyester composition consists of a blend of a copolyester and a homopolyester the amount of said copolyester will range from 75 to 25 percent by weight of the total weight of the blend and the amount of homopolyester will range from 25 to 75 percent by weight of the total weight of the blend. Representative examples of preferred blends include the blends of poly(tetramethylene terephthalate) and poly tetramethylene terephthalate/isophthalate/sebacate) and the blends of poly-(ethylene terephthalate) and poly (tetramethylene terephthalate/isophthalate/sebacate).

Various other materials can be present in the above copolyesters and homopolyesters useful in this invention and such materials can be added either during or after the preparation of the copolyesters and homopolyesters. Such various other materials include stabilizers such as any of the polyester art recognized oxidative, thermal, hydrolytic and ultraviolet light stabilizers and transesterification catalysts such as zinc acetate, manganese acetate, litharge and the like and polycondensation catalysts such as antimony trioxide and titanium compounds. In addition, pigments, delusterants, chain branching agents and other similar additives can be present in the copolyesters and homopolyesters.

The (B) component of the polyester compositions of this invention consists of a synergistic mixture of polyvinyl chloride and at least one compound selected from the group consisting of antimony trioxide, boron trioxide, tetrabromophthalic anhydride, tetrachlorophthalic anhydride and chlorendic acid anhydride, the latter being represented by the formula

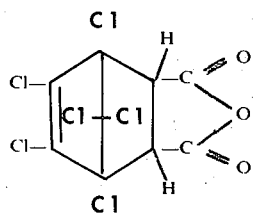

The polyvinyl chloride component useful in the synergistic mixture is an essentially rigid polyvinyl chloride having an intrinsic viscosity which can range from 0.6 to 1.2 as measured in cyclohexane at 30° C. and which can contain stabilizers such as organotin mercaptide or carboxylate; barium cadmium stearate and lead stearate. In addition, the essentially rigid polyvinyl chloride can contain up to 10 mol percent of a modifying monomer unit but preferably the modifying monomer unit is kept below 5 percent. Suitable modifying monomers for the polyvinyl compounds are vinyl acetate, vinyl ethers, vinyl acrylate, vinyl pyridine, vinyl benzene, vinyl chlorobenzenes, vinyl methacrylates, ethylene vinyl acetate copolymers, polyvinyl pyridine, propylene vinyl acetate, polyvinyl acrylates and polyvinyl benzenes.

The following examples illustrate but do not limit the scope of our invention. All references are to weight percent where not otherwise specified.

EXAMPLE 1

Preparation of Polytetramethylene Terephthalate

To a mixture of 4.40 pounds of dimethyl terephthalate and 4.50 pounds of tetramethylene glycol was added 3.0 grams of litharge catalyst (0.15 weight percent based on dimethyl terephthalate). The transesterification was carried out in a 12 liter glass reactor with agitation over a four hour period at a temperature ranging from 140° C. to 235° C. The transesterification product was then transferred into a stainless steel polymerization reactor and polycondensed under 0.5 to 1.5 millimeters of mercury pressure at a temperature ranging from 235° C. at the start of the reaction to 259° C. at the end of the reaction. The polycondensation product, poly(tetramethylene terephthalate), had an intrinsic viscosity of 0.795 measured at 30° C. in a 60/40 phenol/s-tetrachloroethane mixture.

EXAMPLE 2

Preparation of Polytetramethylene Terephthalate/Isophthalate/Sebacate (70/10/20 Molar Ratio) Copolyester To a glass esterification reactor was added 1.82 pounds sebacic acid, 0.73 pound isophthalic acid and 5.114 pounds terephthalic acid, to which was added 9.82 pounds tetramethylene glycol and 10.27 grams lead acetate trihydrate catalyst. The esterification reaction was carried out at a temperature ranging from 198° C. at the start of the reaction to 240° C. at the end over a six hour period.

The glycol esters were then transferred to a polycondensation stainless steel reactor and polycondensed at a pressure of 0.1 millimeter of mercury over a three hour period at a temperature in the range of 240° to 255° C. to yield a 70/10/20 molar ratio poly(tetramethylene terephthalate/isophthalate/sebacate copolyester having an intrinsic viscosity of 0.875.

EXAMPLE 3

Three and one half pounds of the poly(tetramethylene terephthalate) prepared in Example 1 and 3.5 pounds of the poly(tetramethylene terephthalate/isophthalate/sebacate) copolyester prepared in Example 2 were added to a small double cone blender-dryer. Then 95.3 grams of the hindered phenolic phosphite described in Example 1 of U.S. Pat. No. 3,386,952 were added and the mixture tumbled in a blender-dryer at 170° C. for two hours under a reduced pressure of 0.1 millimeter of mercury.

EXAMPLE 4

The copolyester-homopolyester blend prepared in Example 3 was dry blended with 10 percent by weight of a rigid polyvinyl chloride having an intrinsic viscosity of 0.68 as measured in cyclohexane solvent at 30° C. and 5 percent by weight of tetrabromophthalic anhydride. This dry blended composition was then extrusion coated onto a 0.021 inch diameter electrical conducting wire. The coating thickness averaged 0.01 inch and was smooth and free of cracks. The coated wire was then subjected to the Underwriter's Horizontal Flame Test. The burning rate for this sample was found to be 2 inches/minute.

EXAMPLE 5

An experiment was carried out similar to Example 4 above except 5 percent by weight of antimony trioxide was employed in place of the tetrabromophthalic anhydride. The burning rate for this sample was found to be 3.0 inches/minute.

EXAMPLE 6

A control experiment was carried out on an extrusion coated wire employing as the coating material the blend prepared in Example 3. This blend as employed did not contain any mixture of polyvinyl chloride and tetrabromophthalic anhydride or antimony trioxide. This coating, in the absence of the additive mixture, exhibited a burning rate of 7.5 inches/minute.

EXAMPLE 7

Preparation of Poly(Ethylene Terephthalate)

Five pounds dimethyl terephthalate and 3.57 pounds ethylene glycol and an amount of manganese octoate catalyst containing 0.0756 gram manganese (calculated as manganese metal) were charged into a reaction vessel. The mixture was stirred and reacted in a nitrogen atmosphere at a temperature ranging from about 155° C. to about 240° C. until ester interchange reaction was complete. The mixture was then transferred to a stainless steel reaction vessel and an amount of antimony trioxide polymerization catalyst equivalent to 0.021 gram antimony metal was added. The polycondensation reaction was performed by slowly heating to 280° C. with stirring as the pressure was reduced to about one millimeter mercury pressure. After about 10 minutes of polycondensation, 8.0 grams of diphenylbenzene phosphonate stabilizer were added. The polycondensation was continued until the polymer had a molecular weight equivalent to an intrinsic viscosity of 0.80.

EXAMPLE 8

A blend of 50 percent by weight of the poly (ethylene terephthalate) from Example 7 and 50 percent by weight of the poly(tetramethylene terephthalate/isophthalate/sebacate) copolyester from Example 2 were added in ground form to a small double cone blender-dryer. Then 2 percent by weight, based on the weight of the blend, of the hindered phenolic phosphite stabilizer described in Example 1 of U.S. Pat. No. 3,386,952 was added and the mixture tumbled in the blender-dryer at 180° C. for 2.5 hours at about 1 millimeter of mercury pressure. An electrical conducting wire, 0.021 inch in diameter, was extrusion coated with this control mixture to give a coating of 15 mils wall thickness. The burning rate of this control sample in the Underwriters' Horizontal Flame Tester was over 7 inches/minute.

EXAMPLE 9

The copolyester-homopolyester blend prepared in Example 8 was then dry blended with 5 percent by weight of antimony trioxide, 5 percent by weight of polyvinyl chloride having an intrinsic viscosity of 0.68 and 5 percent by weight of chlorendic acid anhydride (Chloran 542). This dry blended composition was extrusion coated onto a 0.021 inch diameter electrical conducting wire as a 0.01 inch wall thickness coating. The burning rate of this sample was 4 inches/minute.

The Underwriters' Horizontal Flame Test was used to evaluate the flame retardancy of the compositions of this invention. In this test a sample of coated wire 20 inches long is laid and held tautly in a horizontal position on supports approximately 8 inches apart. Distances of 2, 7 and 13 inches are marked from one end of the sample. A Bunsen burner, with a vertical flame height of 2 inches with the inner blue cone of the flame one third the vertical flame height, is employed as the source of ignition. The burner is placed in a vertical position under the sample so that the inner blue cone of the flame just touches the under side of the sample at the 2 inch mark. The flame is directed against the sample for a period of 30 seconds and removed. During this test observation was made to determine the rate of burning of the sample within the marked 6 inch length and whether or not any burning particles fell from the samples. Control samples were also run to determine the degree of improved flame retardancy.

As employed throughout this disclosure the intrinsic viscosity is defined as limit ln ($\eta_r$) as C approaches zero in which $\eta_r$ is the viscosity of a dilute solution of the resin in a 60/40 phenol/s-tetrachloroethane solvent mixture in the same units at the same temperature. For the intrinsic viscosities reported in this specification a sufficient sample of each resin was dissolved in a 60/40 phenol/s-tetrachloroethane solvent mixture to form a solution having a resin concentration of approximately 0.4 gram per 100 cubic centimeters of solution. The time of flow of each solution and of the solvent was measured in a No. 1 Ubbelohde Viscometer at 30.0° C. and these times were used in the respective viscosities in the equation above.

While certain representative embodiments and details have been shown for the purpose of illustrating the invention it will be apparent to those skilled in this art that various changes and modifications may be made therein without departing from the spirit or scope of the invention.

What we claim is:
1. Flame retardant linear polyester compositions comprising
  A. a high molecular weight essentially linear copolyester selected from the group consisting of
    1. copolyesters prepared by reacting two or more dicarboxylic acids or the $C_1$–$C_4$ lower alkyl esters thereof, where said acids are selected from the group consisting of saturated aliphatic dicarboxylic acids and aromatic dicarboxylic acids, with one or more glycols selected from the group consisting of glycols represented by the formulas $HO(CH_2)_nOH$ where $n$ is an integer from 2 to 10 and $HOCH_2C(R)_2CH_2OH$ where R is selected from the group consisting of hydrogen and alkyl and aryl radicals,
    2. copolyesters prepared by reacting two or more of the above defined glycols with one or more of the above defined dicarboxylic acids or lower alkyl esters thereof, and
    3. blends comprising a copolyester selected from the group consisting of copolyesters as defined in (1) and (2) above and a homopolyester prepared by the reaction of an aromatic dicarboxylic acid or lower alkyl ($C_1$–$C_4$) ester thereof with a glycol selected from the group of glycols defined by the formulas above
  where said copolyesters and blends of said copolyesters and homopolyesters of (A) have intrinsic viscosities of at least 0.5 and
  B. a synergistic mixture comprised of from 5 to 10 percent by weight based on the total weight of said polyester compositions, of polyvinyl chloride and from 5 to 10 percent by weight, based on the total weight of said polyester compositions of at least one material selected from the group consisting of antimony trioxide, boron trioxide, tetrabromophthalic anhydride, tetrachlorophthalic anhydride and chlorendic acid anhydride.
2. Flame retardant linear polyester compositions comprising
  A. a high molecular weight essentially linear polyester selected from the group consisting of
    1. copolyesters selected from the group consisting of poly(ethylene terephthalate/isophthalate), poly (ethylene terephthalate/2,6-naphthalate), poly(ethylene terephthalate/2,7-naphthalate), poly (ethylene terephthalate/2,6-naphthalate/2,7-naphthalate), poly (tetramethylene terephthalate/isophthalate/sebacate), poly(ethylene/neopentyl terephthalate), poly(1,3-trimethylene terephthalate/isophthalate), poly(ethylene/1,3-trimethylene terephthalate), poly(tetramethylene terephthalate/isophthalate) and poly (ethylene terephthalate/sebacate) wherein said copolyesters have intrinsic viscosities of at least 0.5 and 2. blends of at least one of said copolyesters with at least one homopolyester selected from the group consisting of poly(ethylene terephthalate), poly(trimethylene terephthalate), poly(tetramethylene terephthalate), poly(hexamethylene terephthalate), poly(ethylene-2,6-naphthalate), poly(ethylene-2,7-naphthalate) and poly(ethylene phenylindanate) wherein said copolyesters and homopolyesters each have intrinsic viscosities of at least 0.5 and B. a synergistic mixture comprised of from 5 to 10 percent by weight, based on the total weight of said polyester compositions, of polyvinyl chloride and from 5 to 10 percent by weight, based on the total weight of said polyester compositions of at least one material selected from the group consisting of antimony trioxide, boron trioxide, tetrabromophthalic anhydride, tetrachlorophthalic anhydride and chlorendic acid anhydride.

3. The flame retardant essentially linear polyester compositions of claim 2 wherein (A) is a blend comprised of from 25 to 75 percent by weight, based on the total weight of the blend of a copolyester having an intrinsic viscosity of at least 0.7 and from 75 to 25 percent by weight, based on the total weight of the blend, of a homopolyester having an intrinsic viscosity of at least 0.7.

4. The flame retardant linear polyester compositions of claim 2 wherein (A) is a blend of poly(tetramethylene terephthalate/isophthalate/sebacate) and poly (tetramethylene terephthalate).

5. The flame retardant linear polyester compositions of claim 2 wherein (A) is a blend of poly (tetramethylene terephthalate/isophthalate/sebacate and poly(ethylene terephthalate).

6. The flame retardant essentially linear polyester compositions of claim 2 wherein (B) is a synergistic mixture comprised of from 5 to 10 percent by weight, based on the total weight of said polyester compositions, of polyvinyl chloride and from 5 to 10 percent by weight, based on the total weight of said polyester compositions, of a material selected from the group consisting of antimony trioxide and tetrabromophthalic anhydride.

7. The flame retardant linear polyester compositions of claim 2 wherein the polyvinyl chloride compound of the synergistic mixture (B) is an essentially rigid polyvinyl chloride having an intrinsic viscosity ranging from 0.6 to 1.2 as measured in cyclohexane at 30.0° C.

* * * * *